May 11, 1948.  E. F. WILSON ET AL  2,441,176
METHOD OF FUSION WELDING INVOLVING USE OF
INITIAL LAYER OF FINELY DIVIDED METAL
Filed Sept. 1, 1942
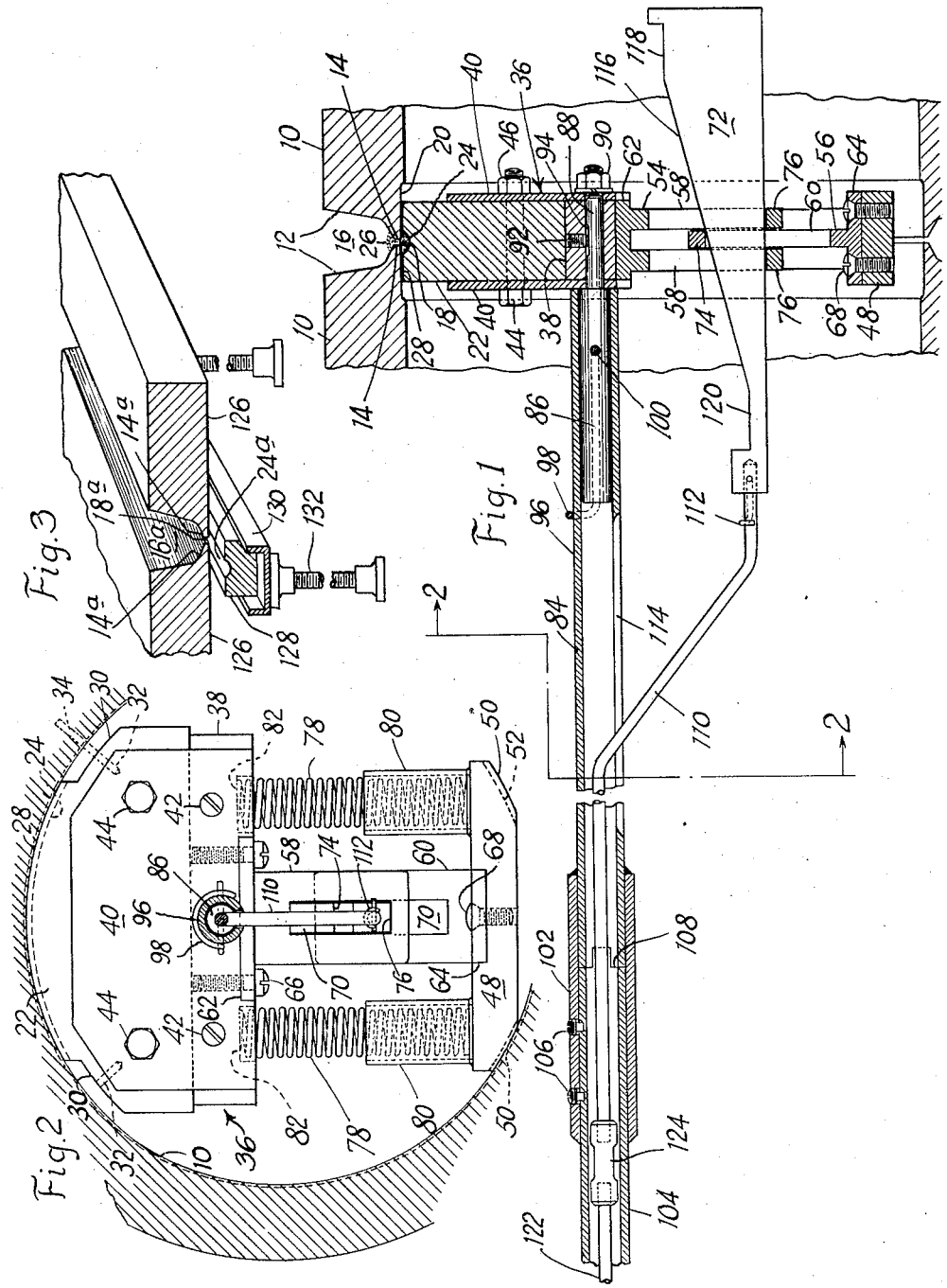
INVENTORS
Evan F. Wilson, John C. Grubb
BY  and Floyd A. Fowler.
/s/ Moran ATTORNEY

UNITED STATES PATENT OFFICE 2,441,176

METHOD OF FUSION WELDING INVOLVING USE OF INITIAL LAYER OF FINELY DIVIDED METAL

Evan F. Wilson, Akron, and John C. Grubb and Floyd A. Fowler, Barberton, Ohio, assignors to The Babcock & Wilcox Company, Jersey City, N. J., a corporation of New Jersey Application September 1, 1942, Serial No. 456,856

5 Claims. (Cl. 219—10)

1

This invention relates to the fusion welding of metal plates and sections wherein the welding surfaces of the parts being welded are arranged in abutting relation to provide a groove for the reception of welding metal.

In conjunction with such welding, commonly referred to as butt-welding, it has been customary to back-up the welding groove with a member which will inhibit the flow of weld metal therefrom while in a molten state, and for this purpose, metal strips or rings have been used which become welded in place. This is ordinarily objectionable and their removal often requires considerable effort and expense by chipping or machining. If left in place, particularly in the case of tubular bodies, such strips or rings obstruct the flow of the medium conveyed and interfere with either visual or radiographic inspection.

Certain varieties of more readily destructible backing members have been developed but these have in general been unsatisfactory due to the materials used and other factors which have resulted in contamination of the weld metal of the joint.

In the development of the present invention it has therefore been our broad object to overcome the deficiencies of prior practices, using new methods, and new apparatus if necessary, so as to assure maximum control over the quality of the joint metal, with minimum attention or inconvenience on the part of the operator.

A more specific object of the invention contemplates a backing member of such characteristics that it may readily be removed from the welding zone when desired, and one that by suitable selection of its material and formation may be utilized repeatedly for successive welding operations either in conjunction with a single seam, or with a plurality of seams.

Another object is the utilization of a backing material or materials which will have no deleterious effect on the weld metal within the groove, but rather will contribute to the production of a sound weld through the prevention of slag entrapment.

A further object is to enable inspection to be made of the joint at any stage of the operations whereby repairs can be made if necessary, before a large amount of metal has been deposited which needs to be chipped out to reach the defect.

Other objects are concerned with the ready manipulation of the backing member before, during and after the welding operations, involving apparatus applicable to work pieces of various forms and dimensions.

2

With the foregoing objects in view, we have chosen to use a non-metallic, refractory material as a backing for the welding groove, of such character as to withstand the direct heat of the electric arc, or other source of welding heat, and thus eliminate any tendency for the material to become permanently attached to the work or to have any detrimental effect on the quality of the weld metal.

The surface in contact with the work is preferably of carbon, and in one form may be provided as a coating or layer of graphite on the outer surface of a ceramic body portion or core, formed for example of silica sand suitably bonded and baked, the graphite being applied either as a dry powder, or as a wash consisting of a graphite-water mixture. A backing member constructed in this manner may be conveniently formed to any desired shape and may be readily destroyed, if desired, to facilitate its removal from the working zone after welding. Furthermore, the refractory core is sufficiently permeable to carry away gases which might otherwise be introduced into the metal. One effect of the carbon layer is to provide an exposed portion more refractory to the heat of welding than the inner body portion, the melting point of carbon being above 6300° F., practically twice that of the body portion which, although composed of high melting point oxides, would ordinarily become fused if directly exposed to the temperatures encountered in welding. A second and more important effect of the carbon surface is to prevent entrapment of slag within the body of weld metal, the slag otherwise reacting with the minerals of the backing member, if left uncoated, and thus adhering to the member to prevent its flotation to the surface.

In another form, the backing member may be of solid graphite or carbon which has certain advantages in that it may be machined or filed to the desired fit, and furthermore, if destroyed for purposes of removal, the residual carbon fragments which are relatively soft will not seriously affect the operation of valves or other parts susceptible to wear.

While the above forms of backing members are effective in minimizing the entrapment of slag by the substantial elimination of chemical reaction with the backing material, there is an additional method to be disclosed for the prevention of mechanical entrapment of slag in the weld groove or where the fit of the backing member against the work offers an opportunity for slag retention.

In accordance with our improved method, with a refractory backing member of carbon or the like placed against the back of the seam, a metal powder, preferably iron, is sprinkled along the groove in a continuous layer against the backing member where the powder is melted upon the application of welding heat to provide a pool which serves as an effective barrier to slag entrapment, any non-metallic bodies such as slag being floated to the surface of the molten iron to assure clean metal throughout the root of the weld.

Weld metal is fused into the groove progressively along its length simultaneously with the melting of the iron powder, the molten powder and deposited weld metal combining to form the initial layer at the base, and subsequent layers being laid down and the welding of the seam completed as described hereinafter.

The powder may be tamped lightly before welding to prevent excessive voids or looseness, but without appreciable pressure, otherwise the desired porosity of the mass would be reduced. The powder is melted rapidly at the exposed surface of the mass, due to the fineness of its particles, thus forming a molten surface from wall to wall of the groove, and since the mass is relatively porous and provides poor thermal contact, the penetration of heat through the powder is retarded despite its rapid surface fusion, and in consequence the fusion is superficial and only a small quantity of powder is required. Moreover the bead protruding from the underside of the finished weld is small which for tubular structures provides a minimum amount of internal obstruction. If there should be any indication of carburization of the metal due to the use of a carbon retainer or backing, this may be avoided by increasing the amount of powder so that only a portion is fused. It is contemplated that for position welding, that is, other than horizontal, it might be desirable to employ a bonded powder in order to hold the powder in place, provided the bonding material is of a non-slag-forming character.

Pure or relatively pure iron powder of a fineness of approximately 100 mesh has been found especially effective for our purpose in the welding of ferrous metals. Steel powder can also be used, but the iron has proved more effective, probably because of its higher melting point. An advantage in using powder is that it is adaptable to various shapes and sizes of grooves, but it is to be noted that in certain instances an iron foil or a mild steel foil may be substituted, or a strip or other shape of such metals, or a combination of one or more of such forms with powder in suitable proportions. It will be understood that alloys of suitable properties may also be used to provide the initial metallic pool.

Experiments have indicated that certain other materials such as plastics might be used to replace carbon as the backing material, and such substitutions are contemplated as being within the scope of the invention provided there is substantial equivalency in their properties relative to carbon for which the substitution is made.

The various objects and advantages of the invention, and the manner in which the invention may be practiced, are more fully disclosed in the detailed description which follows, and in the accompanying drawings, in which—

Fig. 1 is a sectional elevation of apparatus useful in the practice of our invention;

Fig. 2 is an end view of parts shown in Fig. 1, in section along line 2—2; and

Fig. 3 is a fragmentary view showing a modified application of the invention.

According to Fig. 1, the parts 10 to be welded together are in the form of tubular sections, for example, shaped at their end edges 12 to provide lip portions 14 at the bottom of a welding groove 16 adapted to receive and retain molten welding metal for uniting the parts by fusion. The parts 10 may be suitably supported to maintain their relative positions as shown, in axial alignment and with the lips 14 spaced apart to provide a narrow gap 18 of approximately one-eighth inch, for example, for plates measuring about two inches in thickness. The parts 10 may be further shaped at their ends to provide a shallow circumferential recess 20 formed inwardly of the lips 14 and spanning the gap 18 to provide a bearing surface for the arcuately surfaced backing member 22. The recess is preferably formed by counterboring each section 10 to a true cylindrical surface of predetermined diameter, thus correcting for possible variations in inside diameters and eccentricities of the sections, in accordance with the known variations permissible in the commercial manufacture of tubular products. Such counterboring assures a close fit between the backing member 22 and the work at any circumferential location to which the member may be applied, and enables the same member, or members, of a corresponding predetermined curvature, to be used interchangeably with any two correspondingly counterbored sections of the same nominal diameter and thickness, as is desirable in quantity production.

For the purposes of this invention, the backing member 22 of a non-metallic, refractory material, such as carbon, for example, in block form and shaped to engage an arc of the cylindrical surface 20, is formed with a groove 24 in its outer surface to provide a space suitable for the size of inside bead desired, a depth approximately equal to the width of the gap 18 having been found convenient, and a radius somewhat greater than the gap dimension.

With the parts 10 in position for welding as shown in Fig. 1, the grooved block 22 is held in close engagement with the under surface of the lips 14, preferably by means of a tool or machine, of a type to be described in detail hereinafter, whereby the block may be moved conveniently into and out of the welding position, and from one welding zone to another, if necessary, as the welding proceeds. Iron powder of relatively pure chemical composition is placed in the welding groove 16 to a depth at least level with the top edges of the lips 14, and preferably to a somewhat greater depth to cover the lips, approximately as shown at 26 in Fig. 1, prior to introduction of the welding metal, the powder substantially filling the cavity formed by the block groove 24 below the lips 14, the gap 18 between the lips, and the bottom portion of the welding groove 16 above the lips. Welding metal is then deposited within the groove 16, by the electric arc welding process, for example, utilizing electrodes of about one-eighth inch diameter in the top or down-hand position for laying down at least the first two beads or layers at the base of the groove, in successive lengths or sections throughout the total length of the seam. The length of each section is preferably somewhat less than the length of contact surface between the carbon backing-up member and the work, and since the contacting length is made relatively small to insure a close fit, it is generally necessary to shift the carbon member and work relatively for each additional section to be welded. When welding circumferential seams, the length of a section is made small enough to permit welding at all times from the top of the groove. Each section is preferably completed by the deposition of at least two layers while the backing-up block is in place for that particular section, for the purpose of alleviating the danger of the weld metal burning through, the second layer of a section being deposited immediately upon the first layer of the section, and the multiple-layer deposit being allowed to cool to about 800° F. before shifting the block to a new position and proceeding to lay down the first layer of the succeeding section. When it is necessary to renew electrodes, thus requiring interruption of the arc, the end of the bead length already deposited is preferably tapered by chipping for a distance of about one-half inch before the succeeding electrode is started to insure complete fusion and the elimination of holes or defects caused by restriking the arc. It is desirable to add a small quantity of iron powder to the chipped area to replace the amount displaced as a result of the chipping operation.

After the sections have been completed in the manner just described, to the extent of providing a continuous weld throughout the length of the seam at the base of the groove 16, the remainder of the groove may be filled with welding metal according to established practices to complete the union of the two parts 10 of the work.

A desirable feature of this method of welding is that by applying a metal powder within the gap 18 between the lips 14 and above the lips, a protective pool of relatively pure metal is provided at the lowermost point of the seam and prevents slag from the electrode covering, or resulting from oxidation of the work metal, from being entrapped in the gap where the parts to be welded adjoin, the carbon surface of the retainer 22 effectively preventing the formation of slag from beneath the gap.

With this method also, it is possible to examine the weld from the underside at intermediate stages for any defects which may have inadvertently occurred during the process, and to make repairs before depositing additional metal, since the backing member may be readily shifted or removed to entirely expose a portion already welded.

After welding, the iron originally in powder form is evident as a small, fairly uniform ridge standing out from the underside of the work, the use of the highly refractory backing member permitting complete fusion without burning through as might be possible with a steel backing element or metallic backing-up parts, and because of good fusion the ridge and its junction with the work being rounded so that there are no notching or crack-like effects.

A form of apparatus is shown in Figs. 1 and 2 for adjustably supporting the refractory backing-up member 22, for example, in relation to a circumferential seam between tubular work pieces 10. In such an arrangement the outer surface 28 of the member 22 is made arcuate, preferably to a predetermined radius as has already been indicated, for engagement with the counterbored work surface 20 at the underside of the lips 14. The groove 24 preferably extends throughout the entire length of the arcuate surface 28, and beyond the ends of the surface 28 the block is recessed as at 30 where holes 32 are provided to receive pins 34 long enough to extend through the gap 18 between the work parts 10 to facilitate alignment of the groove 24 with the gap, while the block 22 is in contact with the work for welding, as shown, and also while the work is being rotated to an adjacent welding position. The pins are removable and both may be used when making the initial adjustment, whereas for subsequent adjustments, after a section of the weld has been completed and groove 24 is to be aligned with the gap at an adjacent circumferential location, one pin is removed due to interference with the welded section while the bead formed by fusion of the iron powder in that section and extending into the groove 24 serves as a guide in place of the pin. The apparatus for supporting the tubular parts 10 may be of a known type, with rollers, for example, providing for rotation of the parts for the purpose described.

The backing-up apparatus includes an extensible support adapted to be positioned inwardly of the parts 10 for holding the block 22 in firm engagement with one wall of the work while transmitting the resulting thrust to the opposite wall, the support being shown in a partially extended working position in Figs. 1 and 2.

The upper portion 36 carrying the block 22 is in the form of a channel and comprises a rectangular bar 38 to which side plates 40 are secured, as by screws 42, the block 22 resting on the bar 38 and being held in place by bolts 44 extending through the block and side plates, with nuts 46 at their ends. The lower portion comprises a base plate 48 having its outer edges rounded as at 50 to a radius suitable for the size or sizes of tubular parts with which the support is to be used, the resulting curved surfaces 50 being grooved as at 52 to provide a clearance for the inwardly protruding bead of weld metal which is formed as the welding progresses. The recess 20 is preferably made of suitable width to provide a bearing surface for base plate 48 at one end of the support, in addition to a bearing surface for the backing member 22 at the opposite end, as heretofore described.

Upper and lower slotted guides 54 and 56 provide an adjustable connecting strut between the block carrier 36 and base plate 48, the upper guide having outer slotted blades 58 slidably engaging the single intermediately positioned slotted blade 60 of the lower guide to enable the support to be extended and retracted to the extent required for moving the backing-up member 22 into and out of engagement with the work surface. Each guide is flanged at one end, and the flanges 62 and 64 respectively secured to the block carrier 36 and the base plate 48 by screws 66 and 68. The guides are slotted longitudinally as at 70 to provide accommodation for an adjusting wedge member 72 which cooperates with the cross bars 74 and 76 at the ends of the slots for causing the guides to move relatively and thereby adjusting the amount to which the support is extended or retracted. The support is continuously biased toward the fully extended position through the action of springs 78 which are received at their lower ends in cylindrical guides 80 fixed to the base plate 48, and which at their upper ends bear against the carrier bar 38 within the cylindrical guides or recesses 82.

A positioner element, denoted generally by the character 84, is provided for convenience in moving the block-support longitudinally of the work, as is necessary for example when bringing the block 22 into register with the seam interiorly of a tubular body 10. The positioner 84 includes a pin 86 having a portion 88 of reduced diameter extending through the carrier bar 38 and side plates 40 and held in place by nut 90 at its outer end and by the set screw 92 which engages the flat 94 to prevent rotational displacement. A tubular section 96 of the positioner element is detachably connected to the pin 86 by means of a removable locking pin 98 having its end inserted through registering holes 100 in the positioner tube 96 and pin 86. A coupling tube 102 secured adjacent the outer end of the tube 96 provides a socket for a tubular extension section 104 secured therein by set screws 106 and having a notched end 108 interfitting with the end of section 96.

The adjusting wedge 72 by which the elevation of the block 22 is regulated extends through the slots 70 in guides 54 and 56 and is detachably coupled to an adjusting rod 110 by means of a removable locking pin 112, similar to pin 98 for the positioner. The rod 110 is reversely bent as shown to provide a major straight length portion movable longitudinally within the tubular positioner sections 96 and 104 for convenience of manipulation and compactness of assembly, the section 96 being slotted as at 114 a sufficient distance to make available the full range of adjustment as determined by the rise of the inclined surface 116, from the fully retracted position when the cross bar 74 engages the flat surface 118 at the high end of the incline to the fully extended position when the cross bar 74 engages the flat surface 120 at the low end. The adjusting rod 110 may include an extension piece 122 joined to its original length by a coupling 124 and fitted with a handle at its outer end, if desired. The length of extension required will be generally determined by the dimensions of the work, and various lengths may be used to suit various work piece dimensions, the same applying to the length of extension provided for the positioner element 84.

Fig. 3 shows a modified application of the invention wherein the work pieces 126 are represented as flat plates having ends shaped and arranged to provide a longitudinal groove 16a similar in cross-section to the circumferential groove 16 in Fig. 1, with lips 14a separated by a gap 18a as in the previous embodiment. The refractory backing-up block or bar 128 of carbon, for example, having a groove 24a in its upper surface, is supported in a metal trough or channel 130 against the underside of the lips 14a, with the groove 24a in alignment with the gap 18a. It will be understood that the plates 126 may themselves be independently supported by suitable known devices, while providing a separate adjustable support for the block carrier 130 diagrammatically indicated at 132, for advancing and retracting the block 128 relative to the work 126, the number of supporting elements 132 and their positions being varied as required. The welding procedure is as previously detailed, the iron powder being placed in the welding groove 16a to a level sufficient to at least fill the gap 18a and preferably somewhat higher to cover adjacent portions of the lips 14a, and the weld metal deposited throughout the length of the groove at its base, with the backing-up member in position, before adding other weld metal to fill the groove.

The arrangement indicated in Fig. 3 may be applied to the welding of curved plates, as in the welding of longitudinal and circumferential seams in tubular bodies, particularly when the diameters are large enough to permit access to the interior for positioning and adjusting the block carrier 130 and its supports 132, since without change in the form of the welding groove, the variation entails merely minor changes in the shape or contour of the block 128 and carrier 130 appropriate to the curvature of the plates as will be readily understood by those skilled in the art without detailed description and illustration. For the longitudinal seams in smaller sized tubular bodies it may be found desirable to utilize the apparatus of Figs. 1 and 2, with minor adaptations to suit the longitudinal direction of welding, the positioning and adjusting mechanisms remaining substantially the same.

The invention as herein disclosed in accordance with the provisions of the statutes will be understood by persons skilled in the art to be applicable in arrangements other than those specifically described, and to include features which may be used to advantage without a corresponding use of other features, within the scope of the appended claims.

We claim:

1. In a butt-welding process for joining the ends of ferrous metal plates or sections by metal fused within a welding groove defined by and completely separating said ends, backing said groove with a non-metallic non-slag-forming material more refractory to the heat of welding than the metal of the parts to be welded, applying metal powder to the interior of said groove in a relatively shallow layer continuous from wall to wall of said groove and confined to the base portion of said groove in contact with said backing material, said powder consisting solely of substantially pure ferrous metal, applying welding heat to the upper surface of said layer to melt said powder and thereby form a pool of said relatively pure ferrous metal extending from wall to wall of said groove so as to exclude slag from within the base portion of said groove below the surface of said pool, combining from a separate source above said surface additional molten metal with said pool metal to form a slag-free layer of weld metal joining said parts at the lowermost portion of said welding groove, and continuing formation of the weld between said ends by fusion-depositing other additional weld metal within said groove to unite with said initially formed layer.

2. In a butt-welding process for joining ferrous metal plates or sections at their ends by metal fused within a welding groove defined by and completely separating said ends, backing said groove with a substantially rigid mass presenting a non-slag-forming surface of carbon to the work, applying metal powder to the interior base portion of said groove against said carbon backing surface in a relatively shallow continuous layer extending from wall to wall of said groove, said powder consisting solely of substantially pure iron, maintaining an electric arc above said layer of powder between a consumable electrode and the work to initially melt said powder throughout at least the upper surface thereof so as to form a pool of substantially pure molten iron extending from wall to wall of said groove and constituting a barrier to entrapment within the base portion of said groove of slag resulting from the fusion of said electrode, the maintenance of said arc causing fusion-deposited weld metal from said electrode to combine with the molten metal of said pool to form the initial layer of weld metal uniting said plates or sections, and continuing formation of the weld between said ends by causing additional weld metal deposited from said electrode to become fused with said initially formed layer.

3. In a butt welding process for joining ferrous metal components having ends formed and arranged to provide a welding space therebetween with lips on said components partially closing said space at its base, bridging said space at the underside of said lips to inhibit the escape of materials from said space, filling the bottom of said space with a porous layer of finely divided metal to a depth restricted to the base portion of said space while covering the adjacent upper portions of said lips, said finely divided metal consisting solely of substantially pure ferrous metal, applying welding heat locally to the exposed upper surface of said finely divided metal to form a molten metal surface across the width of the space between said lips and thereby exclude from the restricted sub-surface portion of said space slag resulting from the fusion of materials including metal of said components, and depositing molten weld metal from a fusible weld rod onto said molten surface to form the initial layer of weld metal joining said components, the porosity of said mass retarding penetration of welding heat throughout said mass so as to maintain said upper surface molten for floating said slag during the deposition of said weldrod metal.

4. In a butt-welding process for joining ferrous metal components having ends formed and arranged to provide a welding space therebetween with lips on said components partially closing said space at its base, bridging said space at the underside of said lips with a substantially rigid mass more refractory to the heat of welding than the metal of said components and presenting a non-slagging surface to the work, providing a channel in said bridging mass surface in alignment with the space between said lips, filling said channel and the bottom portion of said welding space including said inter-lip space with a porous layer of finely divided metal to a depth restricted to the base portion of said space while covering the adjacent upper portions of said lips, said finely divided metal consisting solely of a ferrous metal having a melting point high enough to compare with that of pure iron, maintaining an electric arc above said layer between a consumable electrode and the work to initially melt said finely divided metal throughout at least the upper surface of said layer so as to form a molten metal surface across the width of the space between said lips and thereby exclude from the restricted sub-surface portion of said space slag resulting from the fusion of materials including metal of said components, and depositing molten weld metal from said electrode onto said molten surface to form the initial layer of weld metal joining said components.

5. In a butt-welding process for joining ferrous metal parts by metal fused within a welding space defined by and completely separating juxtaposed surface portions of said parts, the steps of forming the initial layer of weld metal joining said parts which comprise, backing said space with a substantially rigid mass so as to inhibit the escape of materials from said space, filling the base portion of said space adjacent said mass solely with finely divided ferrous metal arranged in a relatively shallow continuous layer extending from wall to wall of said space, maintaining a zone of welding heat above and exposed to the upper surface of said layer so as to melt said finely divided metal throughout at least said surface and thereby form a pool of said ferrous metal extending from wall to wall of said space, and causing additional metal to be rendered molten by said heat at a position above said pool and to be deposited within said space in uniting relationship to said molten pool metal to form the initial layer of weld metal joining said parts.

EVAN F. WILSON.
JOHN C. GRUBB.
FLOYD A. FOWLER.

REFERENCES CITED

The following references are of record in the file of this patent:

UNITED STATES PATENTS

| Number | Name | Date |
| --- | --- | --- |
| 379,453 | DeBenardos | Mar. 13, 1888 |
| 1,351,445 | Smith | Aug. 31, 1920 |
| 1,435,919 | Fay | Nov. 21, 1922 |
| 1,599,927 | Stresau | Sept. 14, 1926 |
| 1,782,316 | Robinoff et al. | Nov. 18, 1930 |
| 1,810,005 | Burnish | June 16, 1931 |
| 1,902,051 | Wall | Mar. 21, 1933 |
| 1,962,350 | Kane | June 12, 1934 |
| 1,964,926 | Moss | July 3, 1934 |
| 1,990,077 | Kershaw | Feb. 5, 1935 |
| 2,145,009 | Keir | Jan. 24, 1939 |
| 2,241,572 | Armstrong | May 13, 1941 |
| 2,279,044 | Heist | Apr. 7, 1942 |
| 2,281,070 | Jennings | Apr. 28, 1942 |
| 2,294,650 | Bechtle | Sept. 1, 1942 |
| 2,326,865 | Kennedy | Aug. 17, 1943 |
| 2,331,689 | Hodge | Oct. 12, 1943 |
| 2,348,728 | Crecca | May 16, 1944 |
| 2,352,716 | Jones | July 4, 1944 |
| 2,395,723 | Chmielewski | Feb. 26, 1946 |

FOREIGN PATENTS

| Number | Country | Date |
| --- | --- | --- |
| 835,479 | France | Sept. 26, 1938 |

OTHER REFERENCES

Steel, May 4, 1942, page 78.